United States Patent
Fukuda

(10) Patent No.: US 9,464,923 B2
(45) Date of Patent: Oct. 11, 2016

(54) ENCODER SENSOR MOUNTING BODY, DRUM DISK ENCODER, AND MOTOR WITH ENCODER USING SAME

(71) Applicant: KODENSHI CORPORATION, Uji-shi, Kyoto (JP)

(72) Inventor: Hideji Fukuda, Joyo (JP)

(73) Assignee: Kodenshi Corporation, Uji-shi (JP)

( * ) Notice: Subject to any disclaimer, the term of this patent is extended or adjusted under 35 U.S.C. 154(b) by 203 days.

(21) Appl. No.: 14/375,745

(22) PCT Filed: Jan. 23, 2013

(86) PCT No.: PCT/JP2013/051289
§ 371 (c)(1),
(2) Date: Jul. 30, 2014

(87) PCT Pub. No.: WO2013/115031
PCT Pub. Date: Aug. 8, 2013

(65) Prior Publication Data
US 2015/0008802 A1 Jan. 8, 2015

(30) Foreign Application Priority Data

Jan. 31, 2012 (JP) .............................. 2012-018678

(51) Int. Cl.
*H02K 11/00* (2016.01)
*G01D 5/347* (2006.01)
*H02K 5/22* (2006.01)

(52) U.S. Cl.
CPC ............. *G01D 5/3473* (2013.01); *H02K 11/22* (2016.01); *H02K 5/225* (2013.01); *H02K 11/21* (2016.01)

(58) Field of Classification Search
CPC ....... H02K 11/22; H02K 11/21; H02K 5/225
See application file for complete search history.

(56) References Cited

U.S. PATENT DOCUMENTS 4,988,905 A * 1/1991 Tolmie, Jr. ............. H02K 29/06
310/68 B
5,943,214 A * 8/1999 Sato ........................ G08B 6/00
248/638

(Continued)

FOREIGN PATENT DOCUMENTS

| CN | 1992479 A | 7/2007 |
|---|---|---|
| CN | 101032065 A | 9/2007 |

(Continued)

OTHER PUBLICATIONS

State Intellectual Property Office of the People's Republic of China, Office Action Issued in Application No. 201380006526.4, Dec. 4, 2015, 5 pages.

(Continued)

*Primary Examiner* — Dang Le
(74) *Attorney, Agent, or Firm* — Alleman Hall McCoy Russell & Tuttle LLP

(57) ABSTRACT

In order to make it possible to be readily attachable and detachable with respect to a motor and capable of realizing a lead-free encoder sensor mounting body, an encoder sensor is detachably or fixedly attached on a base, the base being pressedly in contact with an electrode terminal of the motor and including a pressing contact part that is electrically connected to a power line, and thus the base is detachably fixed to an end surface of the motor by a pressing force of the pressing contact part.

11 Claims, 14 Drawing Sheets

(56) References Cited

U.S. PATENT DOCUMENTS

| | | | |
|---|---|---|---|
| 7,193,347 B2 | 3/2007 | Tenca et al. | |
| 2005/0179328 A1* | 8/2005 | Tenca | H02K 5/225 310/68 B |
| 2007/0146171 A1* | 6/2007 | Igarashi | H02K 11/22 341/50 |
| 2008/0001106 A1 | 1/2008 | Igarashi et al. | |
| 2008/0197729 A1 | 8/2008 | Igarashi | |

FOREIGN PATENT DOCUMENTS

| | | |
|---|---|---|
| CN | 101286672 A | 10/2008 |
| CN | 201699564 U | 1/2011 |
| JP | 59127557 A | 7/1984 |
| JP | 2002357457 A | 12/2002 |
| JP | 2006067736 A | 3/2006 |
| JP | 2006129692 A | 5/2006 |
| JP | 2007207888 A | 8/2007 |
| JP | 2007215375 A | 8/2007 |
| JP | 2007220442 A | 8/2007 |
| JP | 2008206244 A | 9/2008 |
| JP | 2009017744 A | 1/2009 |
| KR | 100949540 B1 | 3/2010 |

OTHER PUBLICATIONS

ISA Japanese Patent Office, International Search Report and Written Opinion of PCT/JP2013/051289, Apr. 2, 2013, 4 pages.

* cited by examiner (a) (b)

ENCODER SENSOR MOUNTING BODY, DRUM DISK ENCODER, AND MOTOR WITH ENCODER USING SAME

TECHNICAL FIELD

The present invention relates to an encoder sensor mounting body for providing an encoder sensor for use in a motor at a predetermined position with respect to a rotating shaft of the motor.

BACKGROUND ART

In the case where a rotation angle or a rotating speed of a motor is desired to be accurately controlled to be a predetermined value, an encoder is used.

The encoder includes a scale that is mounted to a rotating shaft and an encoder sensor for counting how many slits, which are regularly provided on the scale, pass through due to a rotation of the rotating shaft.

The encoder sensor includes a light emitting element emitting light against the slits in a vertical direction and a light receiving element provided opposite to the light emitting element across the slits so as to be able to detect the light passing through the slits. Here, it is necessary that the encoder sensor should be fixed to a predetermined position with respect to the scale mounted to the rotating shaft.

Conventionally, in order for the encoder sensor to be fixed to a predetermined position and wiring of the electrode terminal of the motor and the encoder sensor to able to be carried out at the same time, the encoder sensor has been attached on a substrate provided on an end surface of the motor.

More specifically, in a motor with an encoder as shown in Patent Literature 1 and FIGS. 14A and 14B, there is formed a through-hole in a substrate C for passing through the electrode terminal in an extending direction of the rotating shaft 14 in the end surface of the motor 1, and the electrode terminal and the wires implemented in the substrate C are fixed by soldering S in a state of the substrate C being attached on the end surface.

However, in this fixing method of the substrate and the encoder sensor, there occur a plurality of problems as described below.

1. In recent years, becoming lead-free in products such as motors has been demanded in consideration of the environment, and products which can do with little soldering and the like are also demanded, but these demands are not met in the present circumstances.

2. In the case where an encoder is mounted to a motor, the assembly results in a complicated cubic shape as shown in FIGS. 14A and 14B, and therefore it becomes a time-consuming task to fix the substrate and encoder sensor to the electrode terminal by soldering.

3. If the positions of the substrate and the encoder sensor are fixed by soldering, in the case where the encoder is removed, the solder should be melted, and once the encoder is mounted, it is very difficult to remove the same. That is, the encoder can not be easily mounted and detached to and from the motor.

CITATION LIST

Patent Literature

Patent Literature 1: JP-A2006-067736

SUMMARY OF INVENTION

Technical Problem

The present invention has been made in consideration of the above problems, having an object to provide an encoder sensor mounting body that is readily attachable and detachable with respect to a motor, capable of being lead-free, and also environment-friendly, as well as a drum disk encoder and a motor with an encoder using the same.

Solution to Problem

That is, an encoder sensor mounting body of the present invention includes: an encoder sensor including a light emitting element and light receiving element opposing each other; a base provided between the encoder sensor and a motor and fixing the encoder sensor at a position apart from a rotating shaft of the motor by a predetermined distance in a radial direction; and a relay connector part provided on the encoder sensor or the base for relaying a signal line for outputting at least a signal from the light receiving element to outside the encoder sensor mounting body and an electric power line for supplying electric power from outside the encoder sensor mounting body to the encoder sensor and the motor, wherein: the encoder sensor is detachably or fixedly attached on the base; and the base includes a pressing contact part that is pressedly in contact with an electrode terminal of the motor and is electrically connected to the electric power line, whereby the base is detachably fixed to an end surface of the motor by a pressing force of the pressing contact part.

With this configuration, since the base is configured so as to be attachable/detachable with respect to the end surface of the motor by the pressing force caused by the pressing contact part being pressedly in contact with the electrode terminal of the motor, it is not necessary to fix the base to the end surface of the motor by soldering. Moreover, since the base is not fixed by soldering, the base and encoder sensor can be readily attached and detached if necessary. Further, the vibration resistance and fixing strength can be also appropriately changed by adjusting the pressing force of the pressing contact part.

That is, according to the encoder sensor mounting body of the present invention, since the encoder sensor can be fixed to a predetermined position without performing the soldering, it becomes possible to detachably mount the encoder sensor to the motor while achieving the lead-free configuration.

In order to fix the encoder sensor and base to predetermined positions with an appropriate strength by the pressing contact part, the pressing contact part may generate a pressing force by holding the electrode terminal.

As a specific configuration for holding the electrode terminal with the pressing contact part, there is an example in which the pressing contact part includes: an electrode terminal inserting groove into which the electrode terminal is inserted; and a metal contacting body that is electrically connected to the electric power line and presses the electrode terminal against a side wall of the electrode terminal inserting groove to be held in the electrode terminal inserting groove.

For example, in the case where the electrode terminal is protruded from the end surface of the motor in a rotating shaft extending direction, as an aspect suitable for achieving an appropriate fixing strength by the pressing contact part, there is an example in which the pressing contact part includes: an electrode terminal inserting groove into which the electrode terminal is inserted; and a pair of metal contacting bodies that are electrically connected to the electric power line and hold the electrode terminal in the electrode terminal inserting groove.

In the case where the electrode terminal is protruded from the side surface portion of the motor in a rotating shaft rotating direction, in order to generate an appropriate pressing force by the pressing contact part and fix the base and the encoder sensor, the pressing contact part is provided so as to be inclined to the electrode terminal in an initial state and the pressing contact part may be in contact with the electrode terminal while bending the electrode terminal at the time of mounting.

In order to further facilitate fixing the base and the encoder sensor to predetermined positions, the base may further include a fitting part that is formed so as to fit to a protrusion part protruded on the end surface of the motor.

In order to make the soldering unnecessary when mounting the base to the motor as well as for the signal line and the electric power line, and for further promoting being lead-free, the relay connector part may be configured of: an insertion port into which an FFC formed by bendably bundling the signal line and the electric power line in a belt shape is inserted; and a holding member for holding the signal line and the electric power line of the FFC inserted into the insertion port between the terminals extending from the light receiving element and the light emitting element.

In order to be able to reduce the number of components by configuring a part of the end surface of the motor using the base, the base may be configured of: an upper member provided with the encoder sensor and formed with the relay connector part in which the electric power line and the signal line are inserted; and a substantially flat plate shaped lower member that is formed with the pressing contact part and attached on the end surface of the motor, wherein the lower member is attached on the end surface of the motor so as to close an opening of a casing of the motor.

As a configuration for detachably fixing the base and the encoder sensor to the predetermined positions even though the motor includes an accommodating hole formed in a side surface in which the electrode terminal is accommodated, there is an example in which the pressing contact part is configured so as to be fitted to the accommodating hole and pressedly in contact with the electrode terminal.

As an appropriate example application using the encoder sensor mounting body of the present invention, there is exemplified a drum disk encoder including: the encoder sensor mounting body described above; and a drum disk scale.

As another appropriate example application using the encoder sensor mounting body of the present invention, there is exemplified a drum disk encoder including: the encoder sensor mounting body described above; and a drum disk scale.

Advantageous Effects of Invention

Thus, according to the encoder sensor mounting body of the present invention, the base and the encoder sensor can be detachably fixed to the predetermined positions without performing the soldering and it can be made environment-friendly while realizing the lead-free configuration.

REFERENCE CHARACTER LIST

Figure 1:
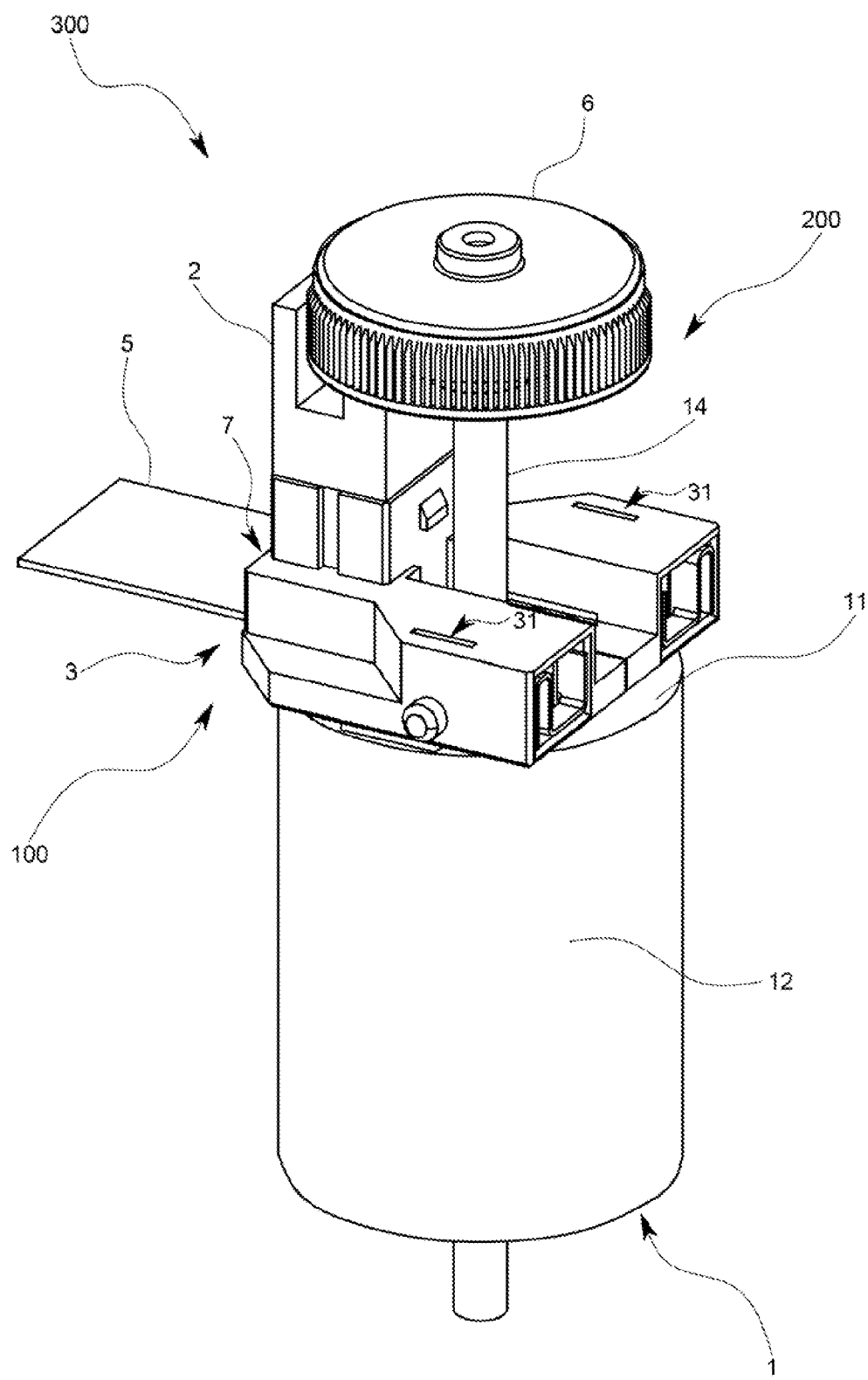
FIG. 1 is a schematic perspective assembly diagram of a motor with an encoder according to a first embodiment of the present invention.

300 . . . motor with encoder
200 . . . drum disk encoder
100 . . . encoder sensor mounting body
1 . . . motor
13 . . . electrode terminal
2 . . . encoder sensor
3 . . . base
31 . . . pressing contact part
7 . . . relay connector part

DESCRIPTION OF EMBODIMENTS

The following describes a first embodiment of the present invention with reference to the drawings.

A motor 300 with an encoder of the first embodiment is intended to be used for printers, small-sized home electric appliances, and the like, of which rotation angles or rotating speeds should be controlled, and as shown in FIG. 1, a drum disk encoder 200 is attached on one end surface 11 where a rotating shaft 14 of a motor 1 is protruded.

Figure 2:
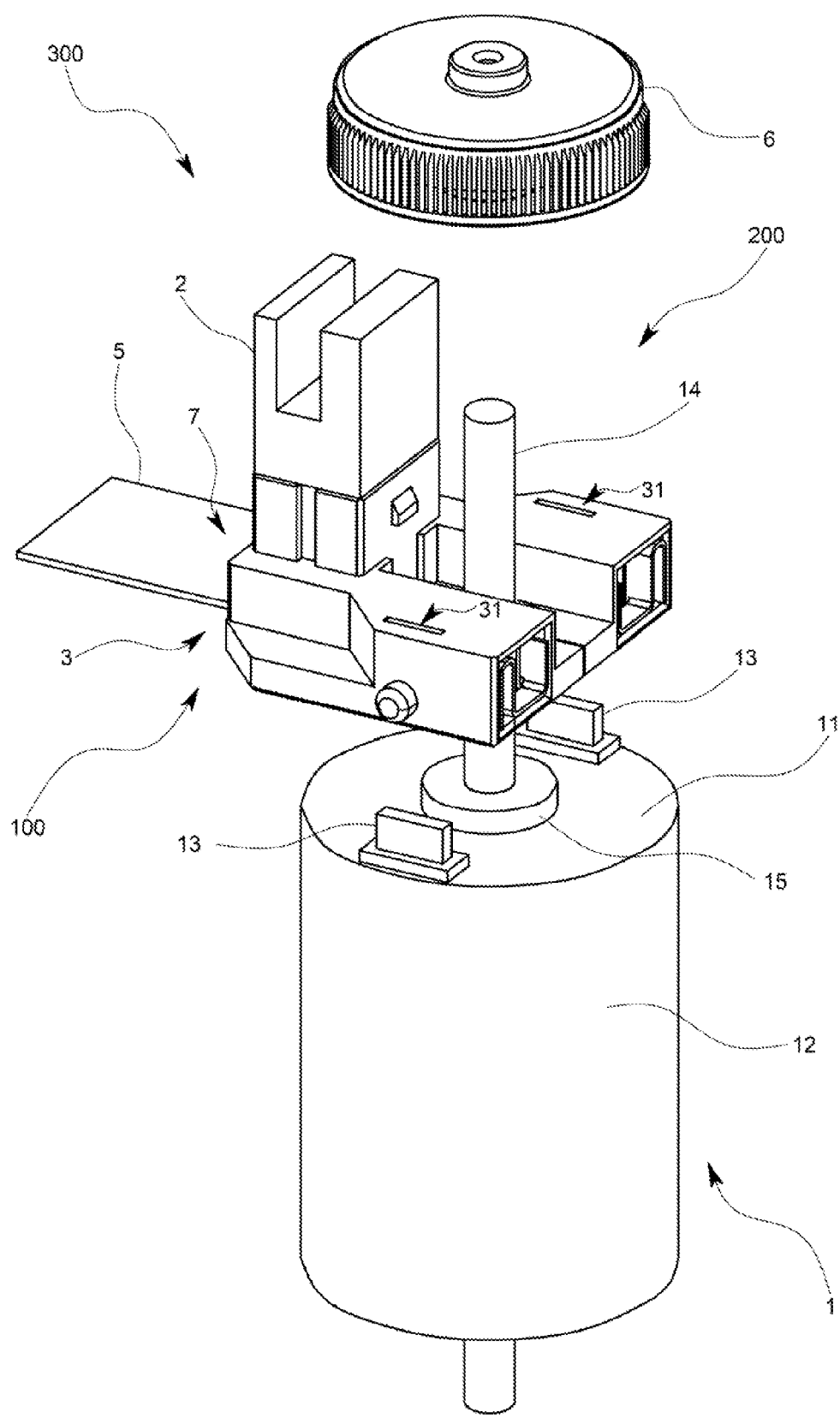
FIG. 2 is a schematic exploded view when viewed from above the motor with the encoder according to the first embodiment.
Figure 3:
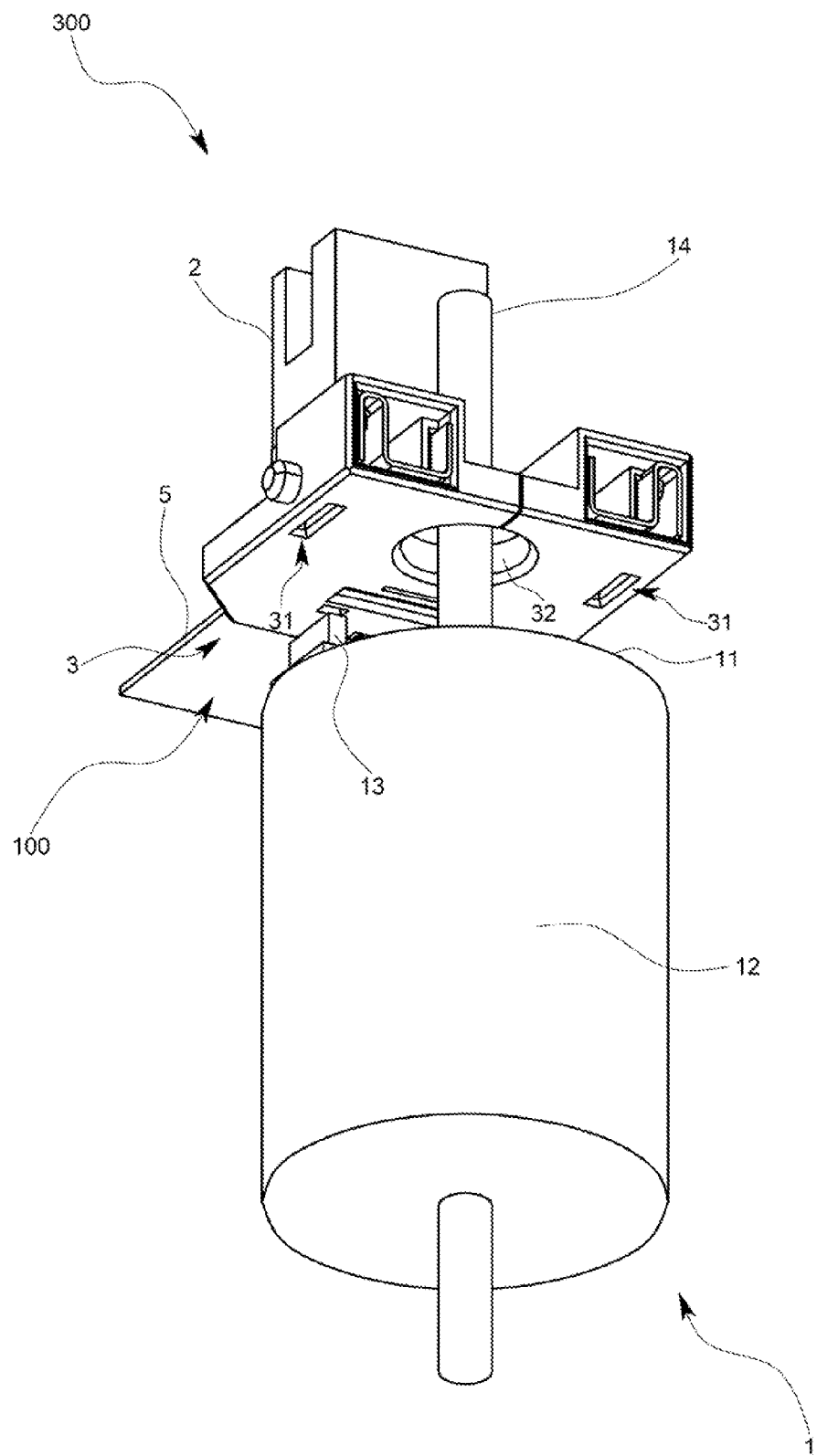
FIG. 3 is a schematic exploded view when viewed from below the motor with the encoder according to the first embodiment.

More specifically, as shown in FIGS. 1 to 3, the drum disk encoder 200 includes: a substantially flat cylindrical shaped drum disk scale 6 which is attached to the rotating shaft 14 of the motor 1; an encoder sensor 2 which is attached so as to sandwich a slit portion provided on a side surface of the drum disk scale 6; and a base 3 on which the encoder sensor 2 is fixed to a predetermined position.

The drum disk scale 6 is made of a resin material and multiple slits are regularly formed at predetermined intervals on its side surface.

The encoder sensor 2 has an upward opening in a substantially U shape and it is arranged so that the opening side thereof sandwiches the side surface of the drum disk scale 6. And the encoder sensor 2 includes: a light emitting element 22 emitting light in a vertical direction against the side surface of the drum disk scale 6; and a light receiving element 21 for detecting the light passing through the slit. The rotation angle of the motor 1 is to be measured based on a pulse number detected by this light receiving element 21.

The base 3 has a substantially flat rectangular parallelepiped shape that is provided between the encoder sensor 2 and the end surface 11 of the motor 1 and it is adapted to fix the encoder sensor 2 in a position separated by a predetermined distance from the rotating shaft 14. More specifically, it is adapted to fix the encoder sensor 2 in a position separated from the rotating shaft 14 in the radial direction by a radius size of the drum disk scale 6 and at a height so that the opening portion of the drum disk scale 6 sandwiches the side surface of the drum disk scale 6. Thus, the encoder sensor mounting body 100 is configured in a state that the encoder sensor 2 and the base 3 are combined.

The following describes in detail the configuration of the base 3 and a function thereof.

As shown in the exploded perspective views of FIGS. 2 and 3, the base 3 is formed with a circular or horn shaped through-hole in the central portion so that the rotating shaft 14 can be passed through. Further, the base 3 is formed with: a relay connector part 7 into which an electric power line for supplying electric power to the electrode terminal 13 is inserted; and a pressing contact part 31 into which the electrode terminal 13 is inserted when it is attached on the end surface 11 of the motor 1.

The through-hole is formed as a fitting part 32 having the same shape as a substantially flat disk-shaped protrusion part 15 protruded in the extending direction of the rotating shaft 14 on the end surface 11 of the motor 1. That is, by bringing the base 3 closer to the end surface 11 of the motor 1 from the exploded state shown in FIGS. 2 and 3 along the axial direction, the protrusion part 15 and the fitting part 32 are to be fitted to each other. Further, there may be also a case where not always only this central protrusion part is fitted but also an outer circumferential part of a motor case is fitted.

The relay connector part 7 is intended to be configured such that, upon insertion of an FFC 5 (flexible flat cable) that is formed by bendably bundling, in a plane belt shape, a signal line for taking out a signal from the encoder sensor 2, a sensor electric power line for supplying electric power to the encoder sensor 2, a motor electric power line electrically connected to the electrode terminal 13 of the motor 1 for supplying electric power to the motor 1, and the like, each of the lines is connected to each of terminals 23 of the light receiving element 21, the light emitting element 22, and the motor 1.

Figure 4A:
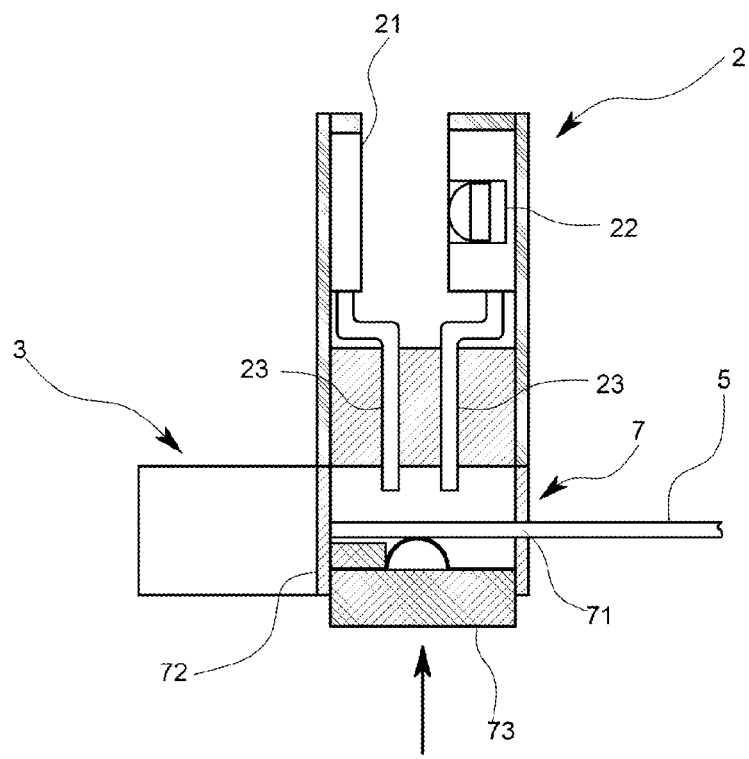
FIGS. 4A and 4B are schematic cross-section views showing an inner structure of a relay connector part of the motor with the encoder according to the first embodiment.
Figure 4B:
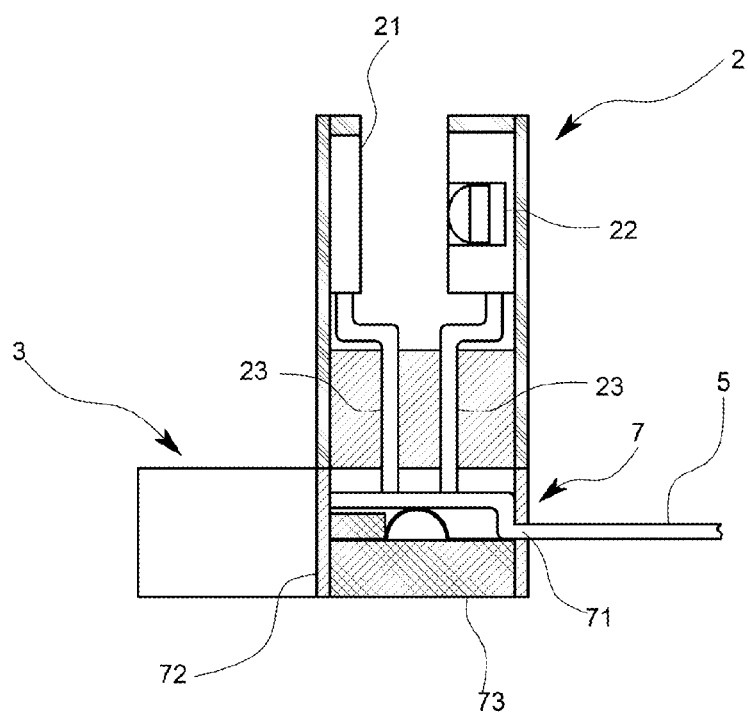

An inner structure of the relay connector part 7 is described with reference to FIGS. 4A and 4B showing a connecting structure between the encoder sensor 2 and the FFC 5.

As shown in FIGS. 4A and 4B, the relay connector part 7 includes: an insertion port 71 into which the FFC 5 is inserted; and a holding member 73 for holding the signal line and the electric power line in the FFC 5 inserted into the insertion port 71 between terminals 23 extending from the light receiving element 21 and the light emitting element 22.

That is, the relay connector part 7 has a thin casing part 72 forming a substantially rectangular parallelepiped shaped space communicating with the insertion port 71 with its lower face opened, and it is provided so that parts of the connecting terminals 23 of the light receiving element 21 and the light emitting element 22 are protruded from the upper surface side to the lower surface side of the thin casing part 72. Further, the holding member 73 is attached slidably in a vertical direction so as to close the lower surface of the thin casing part 72. As shown in FIG. 4A, the FFC 5 is not in contact with each connecting terminal 23 in a state that the holding member 73 is not completely fitted, but as shown in FIG. 4B, by moving the holding member 73 toward an upper surface side of the thin casing, the FFC 5 is bent and brought into contact with the connecting terminals 23. In this state, the position of the holding part is fixed by an engagement part which is not shown and the electrical connection between the FFC 5 and the connecting terminals 23 can be maintained. Note that each electric line is configured to be connected to a predetermined connecting terminal 23 by this operation.

The pressing contact part 31 is adapted to be pressedly in contact with the electrode terminal 13 of the motor 1 and also electrically connected to the electric power line. That is, by a pressing force generated by holding the electrode terminal 13 in the pressing contact part 31, the base 3 and the encoder sensor 2 are intended to be detachably fixed on the end surface 11 of the motor 1.

More specifically, as shown in FIG. 3, the pressing contact part 31 includes: an electrode terminal insertion groove 31a formed in the bottom surface of the base 3; and a metal contact body 31b which is electrically connected to the electric power line and which presses the electrode terminal 13 against the side wall of the electrode terminal insertion groove 31a to be held. When the base 3 is brought closer to the end surface 11 of the motor 1 along the axial direction so that the protrusion part 15 and the fitting part 32 are fitted, the electrode terminal 13 is configured to be inserted between the wall surface of the electrode terminal insertion groove 31a and the metal contact body 31b. At this time, the metal contact body 31b is elastically deformed and the pressing force is generated against the electrode terminal 13 due to a repulsive force thereof.

Figure 5A:
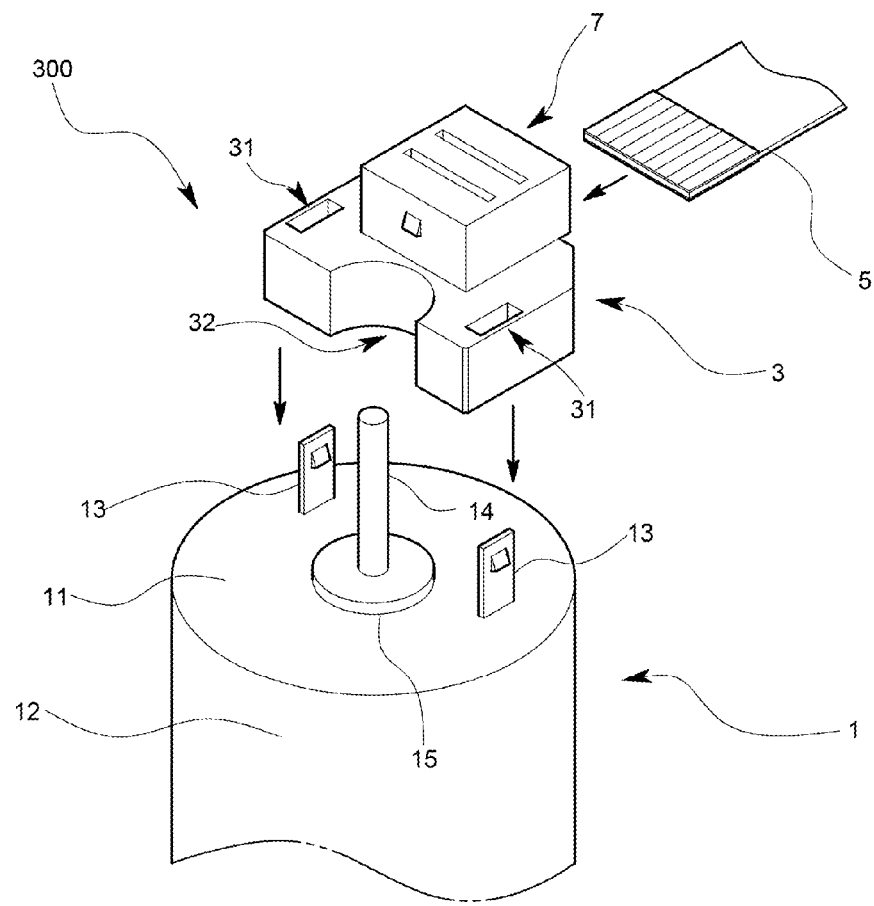
FIGS. 5A and 5B are schematic perspective views showing a mounting structure and method of a base to the motor according to the first embodiment.
Figure 5B:
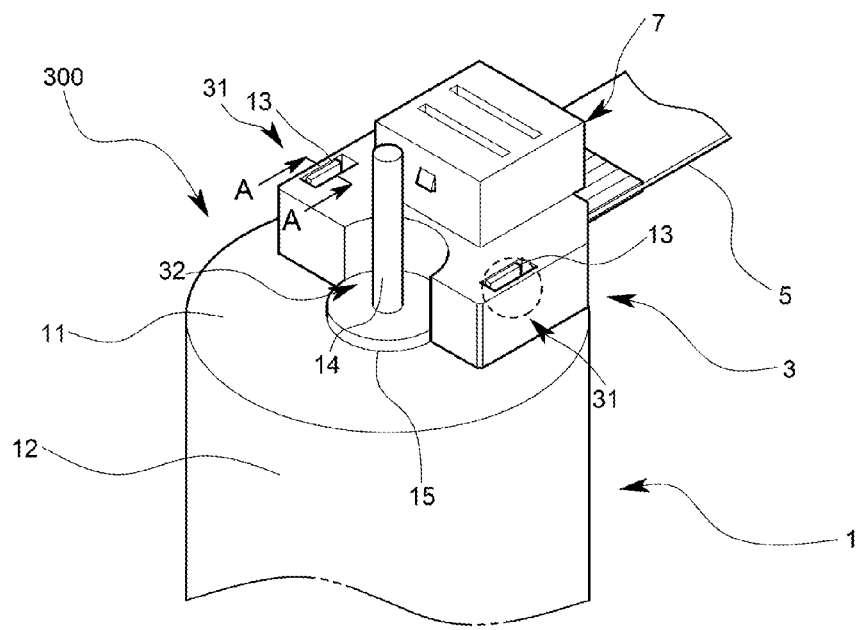
Figure 6:
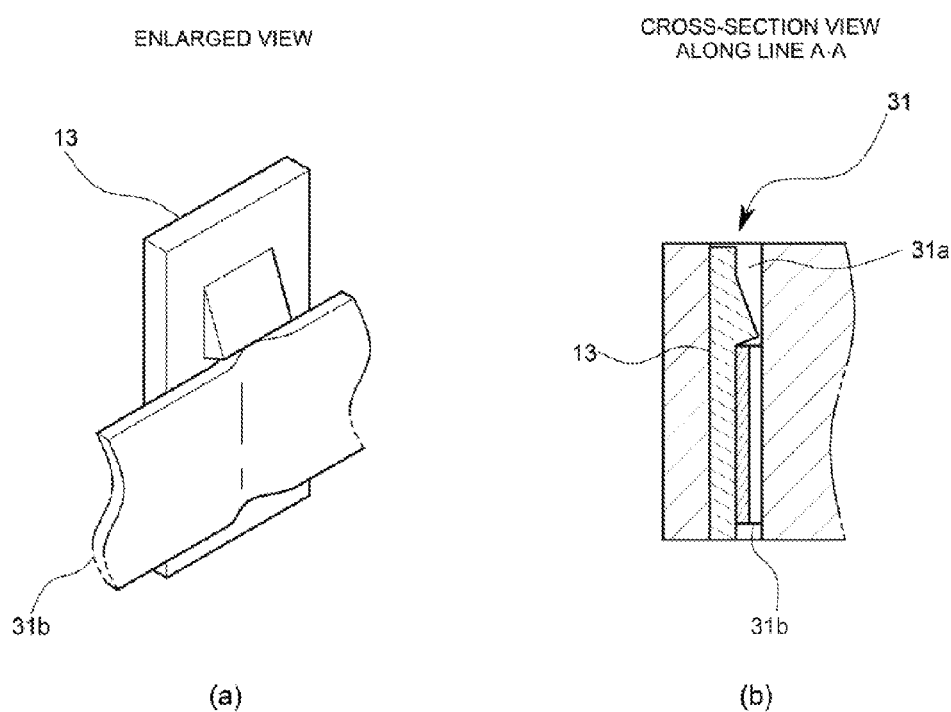
FIGS. 6A and 6B are schematic diagrams showing a structure of a pressing contact part in the first embodiment.

A holding structure of the electrode terminal 13 in this pressing contact part 31 and a mounting method of the base 3 are described with reference to the schematic views of FIGS. 5A to 6B. In FIGS. 5A and 5B, note that a simplification of the base 3 is shown in a state that the encoder sensor 2 is removed for easy comprehension and the shape is different in detail from those in FIGS. 1 to 3.

First, the FFC 5 has been inserted into the relay connector part 7 as shown in FIG. 5A, and the base 3 is brought closer to the end surface 11 of the motor 1 along the axial direction so that the protrusion part 15 and the fitting part 32 are fitted to each other and that each electrode terminal 13 is inserted into the electrode terminal insertion groove 31a and the bottom surface of the base 3 is put into a state of being in contact with the bottom surface of the motor 1 as shown in FIG. 5B.

Then, the holding member 73 is pushed upward to thereby form an electrical connection between each line of the FFC 5 and each connecting terminal 23 as shown in FIGS. 4A and 4B. Further, as shown in FIGS. 6A and 6B, the metal contact body 31b is a metal thin plate extending along the side surface of the electrode terminal insertion groove 31a and a part thereof is protruded and bent toward a side surface of the opposing electrode terminal insertion groove 31a to be substantially a width of the groove. Since the electrode terminal 13 is inserted while a portion of the protrusion part 15 is being elastically deformed by this metal contact body 31b, the electrode terminal 13 is pressed against the side surface of the groove, resulting in a predetermined pressing force being applied. Therefore, the base 3 is fixed by the pressing force due to insertion of the electrode terminal 13 into the pressing contact part 31. Moreover, since it is not completely fixed, it can be also detached by moving the base 3 upward along the axial direction.

Thus, according to the encoder sensor mounting body 100 of the first embodiment, the encoder sensor 2 can be fixed to a predetermined position without performing the soldering. Therefore, the lead-free configuration can be achieved in the motor 300 with the encoder and the encoder sensor 2 can be easily attached and detached.

Further, since there is no soldering work, it becomes possible to easily attach the encoder to the motor 1 and an assembling efficiency can be improved.

A modified example of the first embodiment is described.

Although the pressing contact part 31 of the first embodiment is detachably configured by pressing the electrode terminal 13 against the side wall of the electrode terminal 13 accommodating groove by the metal contact body 31b to be held, the base 3 and the encoder sensor 2 may be fixed to a predetermined position by the other embodiment.

Figure 7:
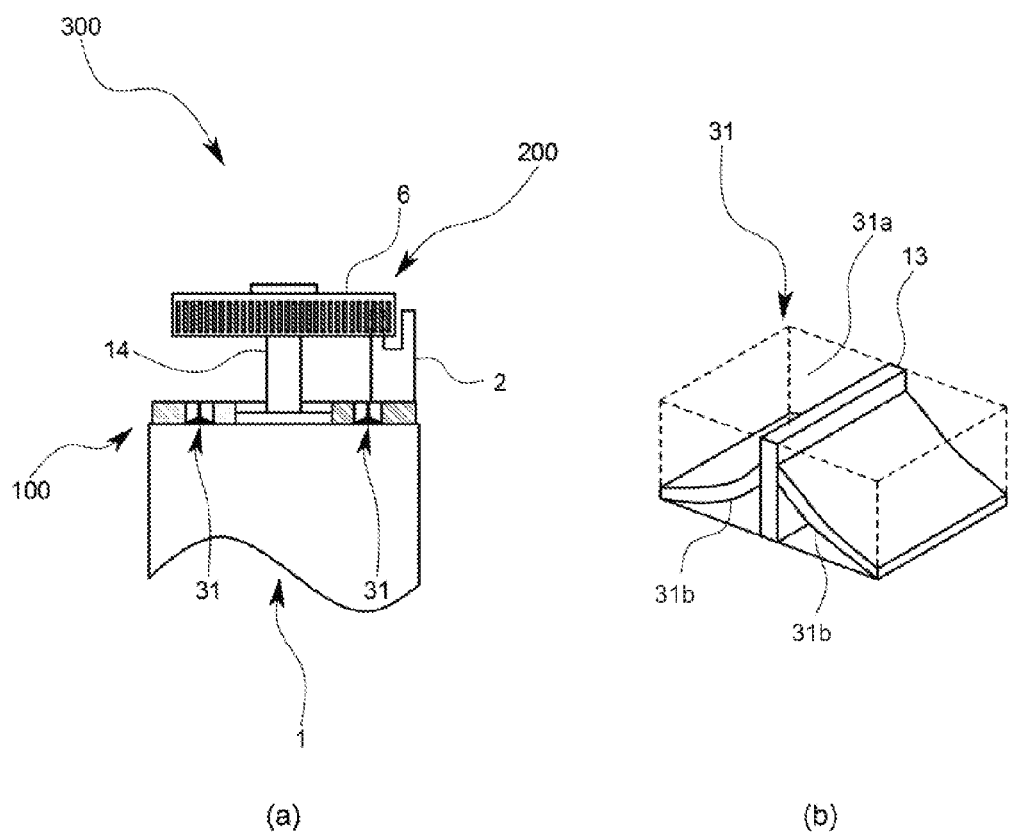
FIGS. 7A and 7B are schematic diagrams showing another example structure of the pressing contact part in the first embodiment.

That is, as shown in FIGS. 7A and 7B, the pressing contact part 31 may also comprise: an electrode terminal insertion groove 31a in which the electrode terminal 13 is inserted; and a pair of metal contact bodies 31b which are electrically connected to the electric power line and hold the electrode terminal 13 in the electrode terminal insertion groove 31a. More specifically, a pair of metal contact bodies 31b are provided so as to close the opening of the electrode terminal insertion groove 31a, and the electrode terminal 13 may be held by an elastic deformation force generated at the time of inserting the electrode terminal 13 between the paired metal contact bodies 31b.

Even in this case, the base 3 and the encoder sensor 2 can be detachably fixed to a predetermined position without carrying out soldering.

Next, a motor 300 with an encoder of the second embodiment is described. Note that members corresponding to the motor 300 with the encoder shown in the first embodiment are designated by the same reference numerals.

Figure 8:
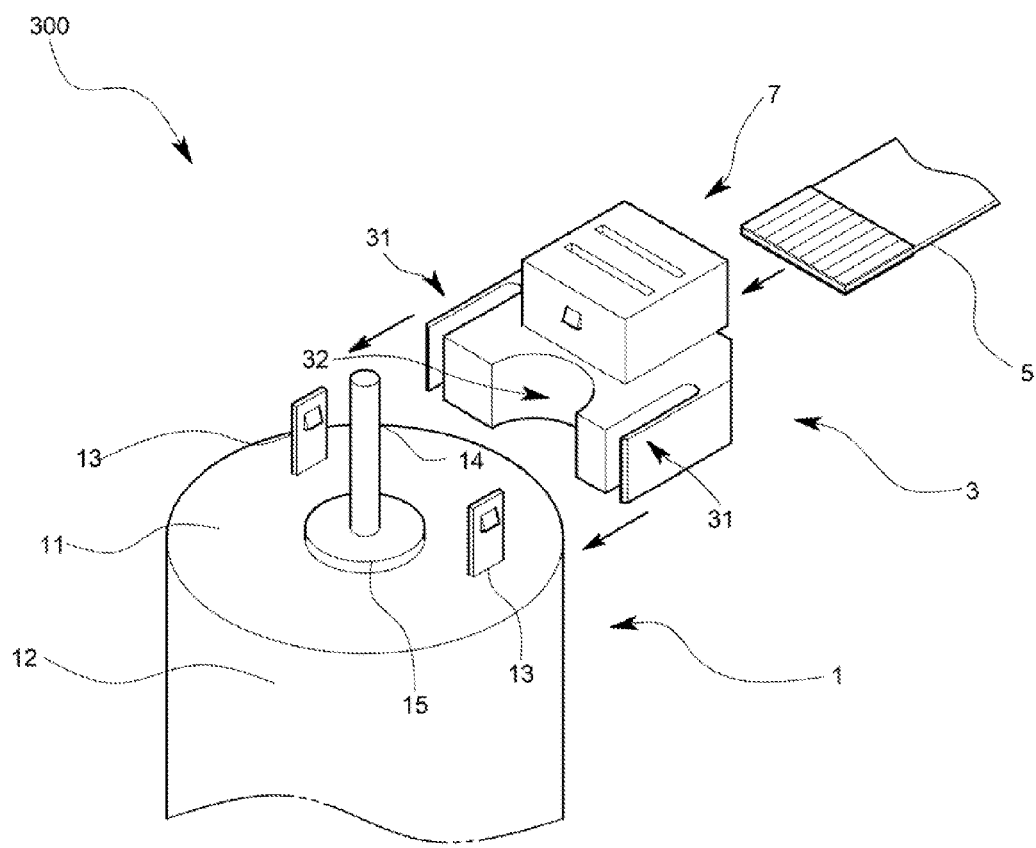
FIG. 8 is a schematic perspective view showing a mounting structure and method of a base to a motor in the second embodiment of the present invention.

Regarding the motor 300 with the encoder of the second embodiment, as shown in FIG. 8, the encoder sensor mounting body 100 is not mounted by moving along the axial direction of the motor 1 but it is configured so as to be mounted by sliding in the radial direction.

More specifically, the electrode terminal insertion groove 31a formed in the pressing contact part 31 has one of the side surfaces opened so that the electrode terminal 13 can be inserted from the radial direction. Further, the shape of the fitting part 32 which is fitted to the protrusion part 15 of the motor 1 is also formed to be a substantially semicircular shape and formed to be able to fit by sliding in the radial direction.

Even in this case, the base 3 and the encoder sensor 2 can be detachably attached on the predetermined positions by the pressing force of the pressing contact part 31 and a substantially similar effect to the first embodiment can be exhibited.

Figure 9:
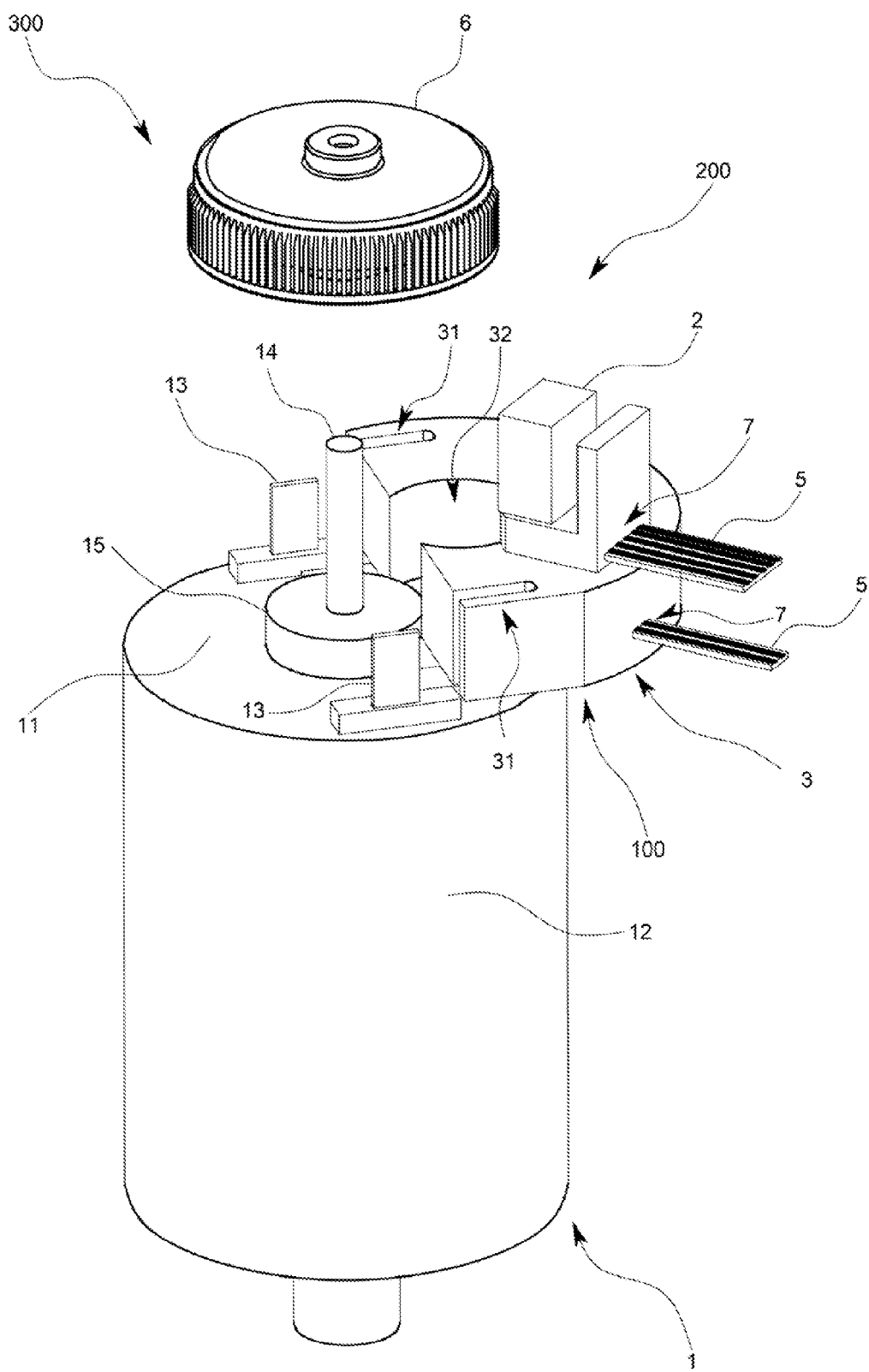
FIG. 9 is a schematic perspective view showing an example configuration of a motor with an encoder according to the second embodiment of the present invention.

The following describes a modified example of the second embodiment. As shown in FIG. 9, the relay connector part 7 may be provided not only in the base 3 but also in the encoder sensor 2. In other words, a plurality of relay connector parts 7 are provided and the wirings relayed by the respective relay connector parts 7 may be different kinds, respectively. For example, the FFC 5 inserted into the relay connector part 7 formed in the base 3 may be a bundle of the electric power lines for driving the motor 1 and the FFC 5 inserted into the relay connector part 7 formed in the encoder sensor 2 may be a bundle of the signal lines for taking out signals from the light receiving element 21 and the electric power lines for driving the light receiving element 21 and the light emitting element 22.

Next, a motor 300 with an encoder of the third embodiment is described. Also, in the third embodiment, members corresponding to the motor 300 with the encoder in the first embodiment are designated by the same reference numerals.

Figure 10:
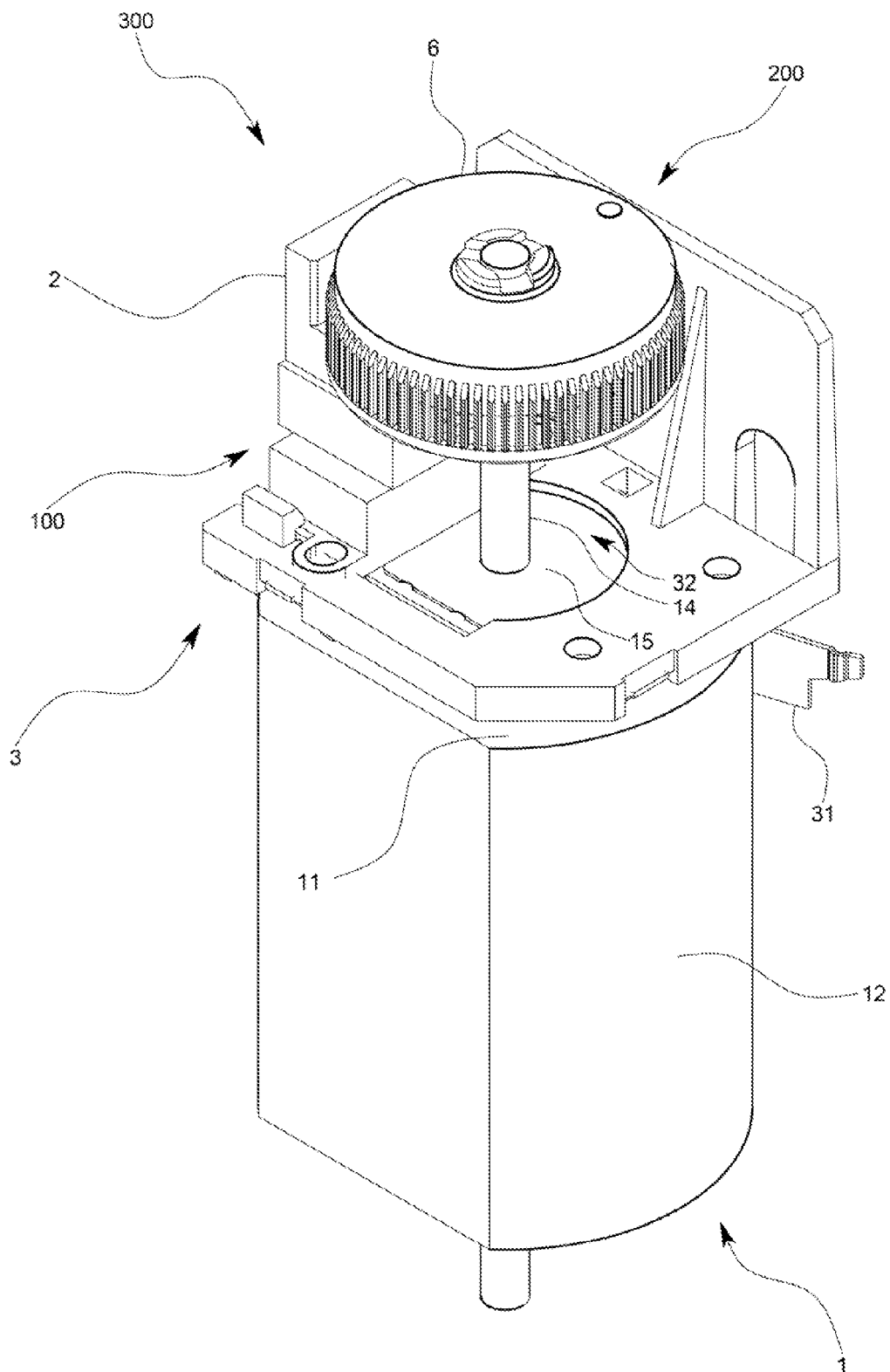
FIG. 10 is a schematic perspective view showing a motor with an encoder according to a third embodiment of the present invention.

Regarding the motor 300 with the encoder of the third embodiment, as shown in FIG. 10, the electrode terminal 13 is not protruded in the axial direction from the end surface 11 of the motor 1 but is a type protruded from the side surface 12 of the motor 1 along the circumferential direction.

In accordance with such a protrusion aspect of this electrode terminal 13, the pressing contact part 31 formed in the base 3 of the third embodiment is provided so as to be inclined with respect to the electrode terminal 13 in the initial state, and the pressing contact part 31 is formed so as to be brought in contact with the electrode terminal 13 while bending the electrode terminal 13 at the time of mounting.

Figure 11A:
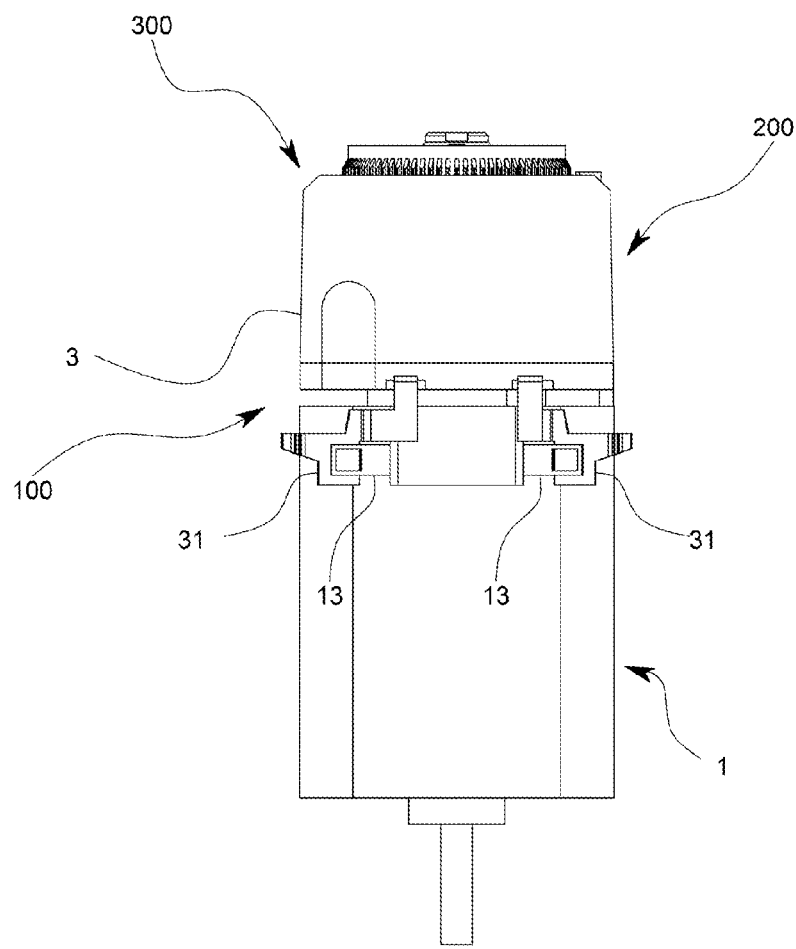
FIGS. 11A and 11B are schematic diagrams showing a structure of a pressing contact part in the third embodiment.
Figure 11B:
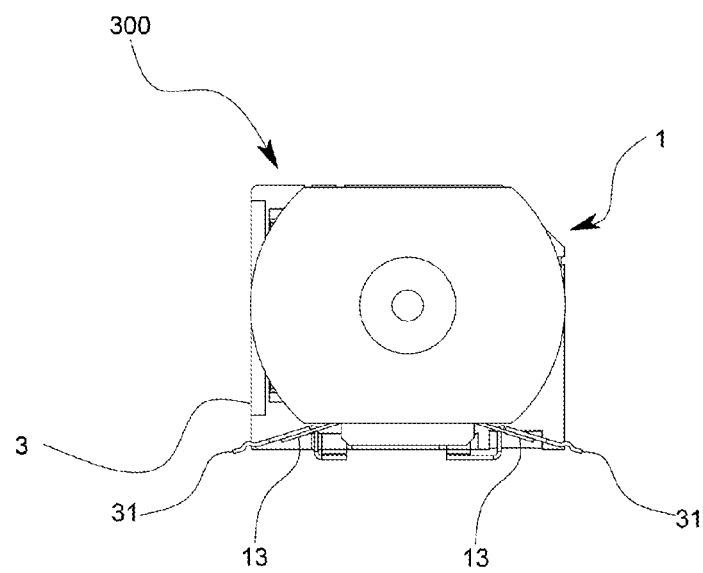
Figure 12:
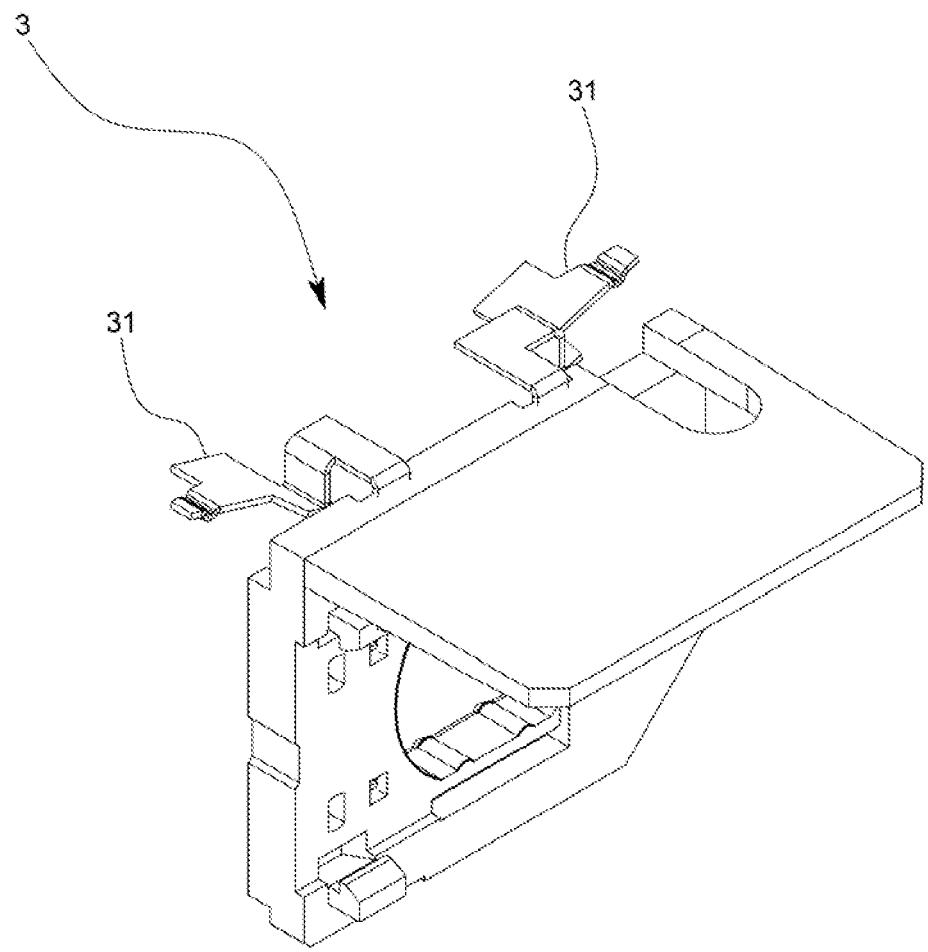
FIG. 12 is a schematic perspective view showing details of the base and pressing contact part in the third embodiment.

More specifically, the base 3 is formed to have a substantially L shape, and the pressing contact part 31 is formed as a metal thin plate mounted in a substantially V shape when viewed from the lower surface as shown in FIGS. 11A to 12. That is, the pressing contact part 31 is formed of a metal plate that is inclined and bent in an oblique direction with respect to the electrode terminal 13, and a pressing force is generated by a repulsive force generated by elastically deforming the electrode terminal 13, and thus the base 3 is intended to be fixed to the end surface 11 of the motor 1.

Thus, even if the electrode terminal 13 is a type of being formed so as to be protruded in the circumferential direction in the side surface of the motor 1, the base 3 and the encoder sensor 2 can be detachably fixed to a predetermined position without carrying out soldering. Therefore, the lead-free configuration can be realized with good assemblability as well, similarly to the first embodiment.

Next, a motor 300 with an encoder of the fourth embodiment is described. Also, in the fourth embodiment, members corresponding to the motor 300 with the encoder in the first embodiment are designated by the same reference numerals.

In the motor 300 with the encoder of the fourth embodiment, the electrode terminal 13 is accommodated in an accommodating hole 16 formed in the side surface of the motor 1.

Figures 13A, 13B:
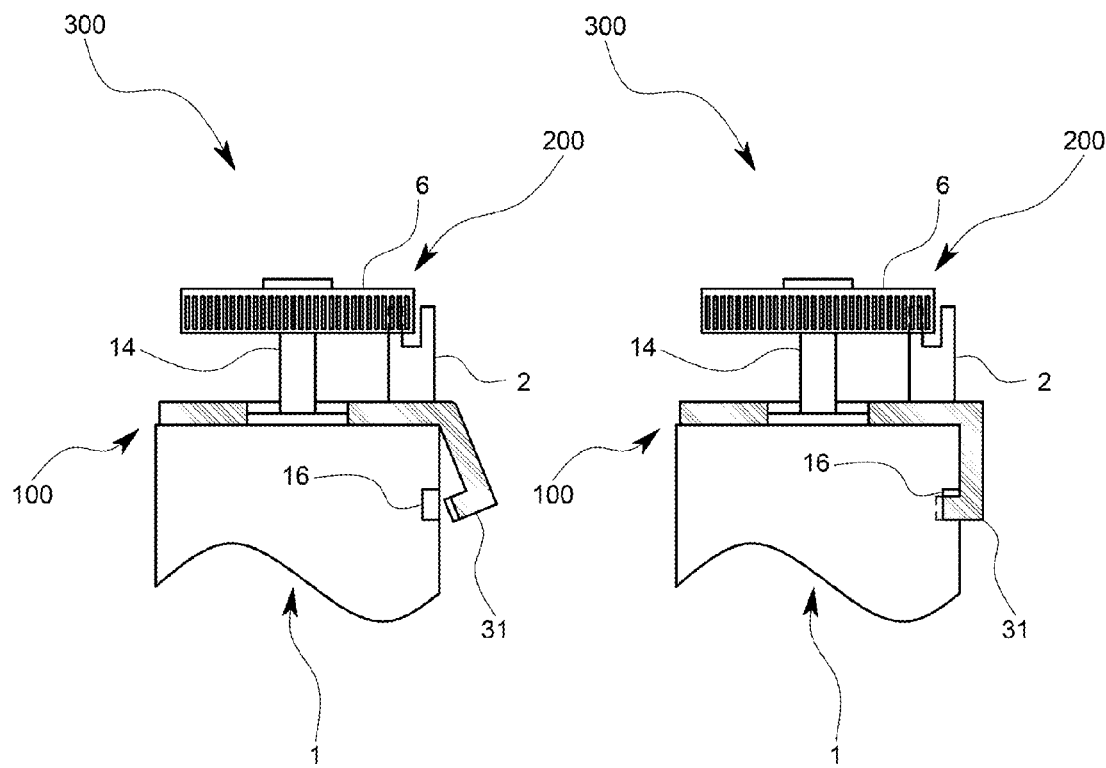
FIG. 13A-13C are schematic perspective views showing a motor with an encoder according to a fourth embodiment of the present invention.

As shown in FIG. 13A, the pressing contact part 31 formed on the base 3 in the fourth embodiment is deformably configured, and as shown in a state that the pressing contact part 31 is inserted into the accommodating hole 16 in FIG. 13B, the pressing contact part 31 is formed to have a shape slightly smaller than the accommodating hole 16. Further, the electrode terminal 13 is a female-type terminal and the pressing contact part 31 is a male-type terminal. That is, the base 3 and the encoder sensor 2 are configured so as to be attachable/detachable to and from the predetermined position by the pressing force that is generated by inserting the pressing contact part 31 to the electrode terminal 13 provided on the bottom in the accommodating hole 16 and pressedly bringing into contact.

Thus, even in the case where the electrode terminal 13 exists in the accommodating hole 16, the base 3 and the encoder sensor 2 can be detachably fixed to the predetermined position, similarly.

Figure 13C:
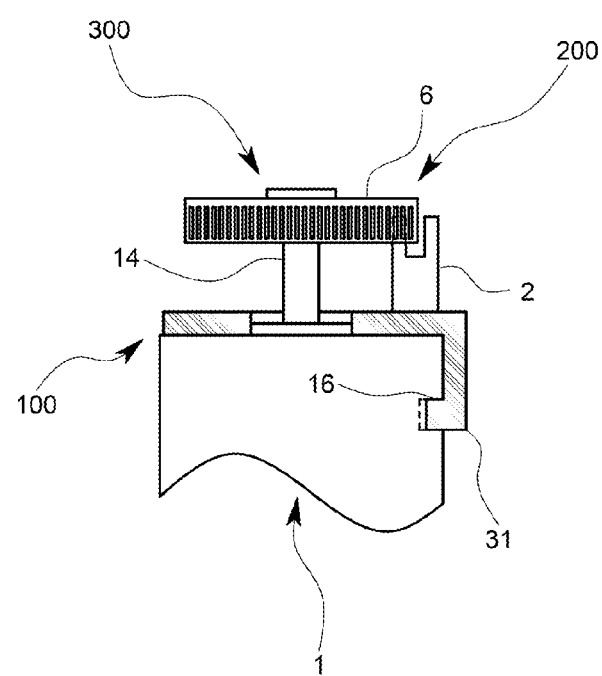
Figure 14A:
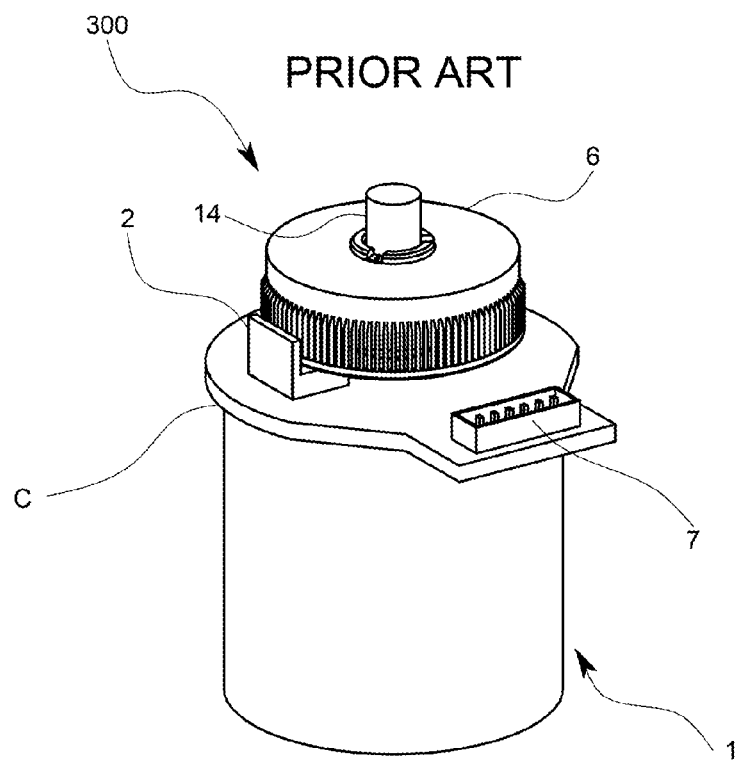
FIGS. 14A and 14B are schematic perspective views showing a motor with an encoder to which an encoder sensor is fixed by conventional soldering.
Figure 14B:
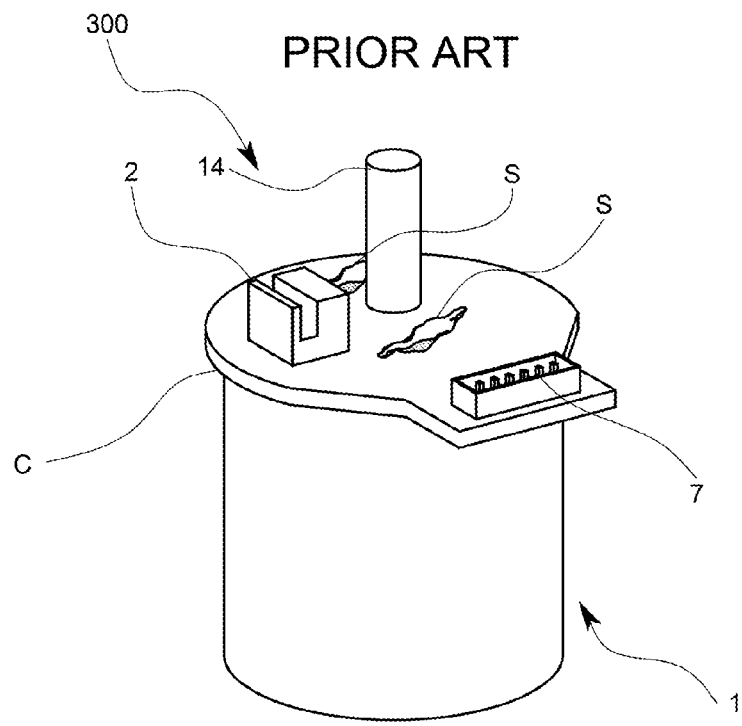

In addition, in order to further improve a fixing strength when the base 3 is fixed on the end surface 11 of the motor 1 as shown in FIG. 13C, the shape of the accommodating hole 16 and the shape of the pressing contact part 31 may be made substantially identical so as to be fitted, for example, to a degree of usual fitting.

With this configuration, since the base 3 can be fixed not only by the pressing force of the pressing contact part 31 but also by a friction force generated by fitting between the accommodating hole 16 and the pressing contact part 31, stability can be improved.

The other embodiments are described.

In each of the embodiments, although it is configured that the base is placed on the end surface of the motor, the base may serve as the end surface of the motor. Specifically, the base may be configured of; an upper member provided with the encoder sensor and formed with the relay connector part into which the electric power line and the signal line are inserted; and a substantially flat plate lower member which is formed with the pressing contact part and attached on the end surface of the motor, and the lower member may be attached on the end surface of the motor so as to close the casing opening of the motor.

The relay connector part is not only specialized for fixing of the FFC as shown in the embodiments but also the other connecting method without necessitating soldering may be used. Further, the encoder sensor may not only be detachably attached on the base, but also it may be fixed. Further, the encoder sensor and the relay connector part are not gathered and provided in one place on the base as in each of the embodiments, but the encoder sensor and the relay connector part may be provided in separate places on the base. For example, the encoder sensor and the relay connector part may be provided on the base so as to be separated across the rotating shaft.

In each of the embodiments, although the drum disk encoder is described, the present invention may be applied to various types such as, for example, a metal disk encoder, film encoder, and the like.

More specifically, in each of the embodiments, although the encoder sensor has an opening formed in the axial direction of the motor and the light receiving element and the light emitting element are oppositely arranged in the radial direction so as to sandwich the side surface of the drum disk scale in order to count a number of the passing though slits provided on the drum disk scale, the present invention may be applied to other scales.

That is, in the case of using a type of the scale that is plate-shaped and provided with slits passing through in the axial direction of the motor, the encoder sensor may have an opening in the radial direction in accordance therewith and the light receiving element and the light emitting element may be provided so as to be opposite in the axial direction. Even such an encoder sensor can be detachably fixed to a predetermined position from the rotating shaft by the base of the present invention.

In conclusion, the encoder sensor mounting body of the present invention can be applied regardless of the shape of the scale.

The pressing contact part is not limited to those shown in each of the embodiments and any type will do so long as soldering is unnecessary and the mounting method is attachable/detachable one.

In addition, various changes and combinations of the embodiments may be performed unless being against the spirit of the present invention.

INDUSTRIAL APPLICABILITY

According to the present invention, it is possible to provide an encoder sensor mounting body being lead-free and also environment-friendly, a drum disk encoder and a motor with an encoder using the same.

The invention claimed is:

1. An encoder sensor mounting body comprising:
    an encoder sensor including a light emitting element and light receiving element opposing each other;
    a base provided between the encoder sensor and a motor and fixing the encoder sensor at a position apart from a rotating shaft of the motor by a predetermined distance in a radial direction; and
    a relay connector part provided on the encoder sensor or the base for relaying a signal line for outputting at least a signal from the light receiving element to outside the encoder sensor mounting body and an electric power line for supplying electric power from outside the encoder sensor mounting body to the encoder sensor and the motor, wherein:
    the encoder sensor is detachably or fixedly attached on the base; and
    the base includes a pressing contact part that is pressedly in contact with an electrode terminal of the motor and is electrically connected to the electric power line, whereby the base is detachably fixed to an end surface of the motor by a pressing force of the pressing contact part.

2. The encoder sensor mounting body according to claim 1, wherein the pressing contact part generates the pressing force by holding the electrode terminal.

3. The encoder sensor mounting body according to claim 1, wherein the pressing contact part includes:
    an electrode terminal inserting groove into which the electrode terminal is inserted; and
    a metal contacting body that is electrically connected to the electric power line and presses the electrode terminal against a side wall of the electrode terminal inserting groove to be held in the electrode terminal inserting groove.

4. The encoder sensor mounting body according to claim 1, wherein the pressing contact part includes:
    an electrode terminal inserting groove into which the electrode terminal is inserted; and
    a pair of metal contacting bodies that are electrically connected to the electric power line and hold the electrode terminal in the electrode terminal inserting groove.

5. The encoder sensor mounting body according to claim 1, wherein the pressing contact part is provided so as to be inclined to the electrode terminal in an initial state and the pressing contact part is in contact with the electrode terminal while bending the electrode terminal at the time of mounting.

6. The encoder sensor mounting body according to claim 1, wherein the base further comprises a fitting part that is formed so as to fit to a protrusion part protruded on the end surface of the motor.

7. The encoder sensor mounting body according to claim 1, wherein the relay connector part includes:

an insertion port into which an FFC (flexible flat cable) formed by bendably bundling the signal line and the electric power line in a belt shape is inserted; and a holding member for holding the signal line and the electric power line of the FFC inserted into the insertion port between the terminals extending from the light receiving element and the light emitting element.

8. The encoder sensor mounting body according to claim 1, wherein the base includes:

an upper member provided with the encoder sensor and formed with the relay connector part in which the electric power line and the signal line are inserted; and a substantially flat plate shaped lower member that is formed with the pressing contact part and attached on the end surface of the motor, wherein the lower member is attached on the end surface of the motor so as to close an opening of a casing of the motor.

9. The encoder sensor mounting body according to claim 1, wherein the motor includes an accommodating hole formed in a side surface in which the electrode terminal is accommodated, and wherein the pressing contact part is configured so as to be fitted to the accommodating hole and pressedly in contact with the electrode terminal.

10. A drum disk encoder comprising:

the encoder sensor mounting body according to claim 1; and a drum disk scale.

11. A motor with an encoder comprising:

the drum disk encoder according to claim 10; and the motor.

* * * * *